(12) United States Patent
Cohen et al.

(10) Patent No.: US 11,048,770 B2
(45) Date of Patent: Jun. 29, 2021

(54) ADAPTIVE RESPONSE GENERATION ON AN ENDPOINT

(71) Applicant: CyberArk Software Ltd., Petach-Tikva (IL)

(72) Inventors: Roi Cohen, Jerusalem (IL); Doron Aharon Naim, Modiln (IL); Lavi Lazarovitz, Ramat-Gan (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/838,394

(22) Filed: Apr. 2, 2020

(65) Prior Publication Data

US 2020/0233913 A1 Jul. 23, 2020

Related U.S. Application Data

(63) Continuation of application No. 15/079,298, filed on Mar. 24, 2016.

(51) Int. Cl.
*G06F 16/9535* (2019.01)
*H04L 29/06* (2006.01)

(52) U.S. Cl.
CPC ...... *G06F 16/9535* (2019.01); *H04L 63/1425* (2013.01); *H04L 63/0227* (2013.01)

(58) Field of Classification Search
None
See application file for complete search history.

(56) References Cited

U.S. PATENT DOCUMENTS

| | | | |
|---|---|---|---|
| 8,156,541 B1 | 4/2012 | Thomas et al. | |
| 8,682,718 B2 | 3/2014 | Zwicky | |
| 9,766,998 B1 | 9/2017 | Sar et al. | |
| 9,838,427 B2 | 12/2017 | Quinlan et al. | |
| 9,881,065 B2 | 1/2018 | Banti et al. | |
| 9,922,122 B2 | 3/2018 | Garg et al. | |
| 10,164,982 B1* | 12/2018 | Lazarovitz | H04W 12/069 |
| 2011/0231443 A1* | 9/2011 | Hannel | H04L 63/20 |
| | | | 707/776 |
| 2012/0005182 A1 | 1/2012 | Monteverde et al. | |
| 2012/0166453 A1* | 6/2012 | Broder | G06Q 50/01 |
| | | | 707/752 |

(Continued)

*Primary Examiner* — Kim T Nguyen
(74) *Attorney, Agent, or Firm* — Finnegan, Henderson, Farabow, Garrett & Dunner, LLP

(57) ABSTRACT

An endpoint configured for adaptively generating responses to data queries, comprising program store for storing code, and one or more processors of an endpoint coupled to the program store for executing the code which comprises:
(1) Code instructions for detecting a data query from a requester with respect to one or more information resources of the endpoint.
(2) Code instructions for adaptively generating a response to the data query. The adaptively generated response comprises data indicative of one or more fictive information resources which are of a similar type as the information resource(s). The response is adaptively generated according to an analysis of data extracted from the data query, the information resource(s), previous interaction of the requester with the endpoint and/or identified information resource operation(s) at the endpoint which precede the detection of the data query.
(3) Code instructions for providing the adaptively generated response to the requester.

20 Claims, 5 Drawing Sheets

(56) References Cited

U.S. PATENT DOCUMENTS

| | | | |
|---|---|---|---|
| 2015/0117232 A1* | 4/2015 | Dunne | H04M 7/0072 |
| | | | 370/252 |
| 2016/0164761 A1* | 6/2016 | Sathyanarayana | ............... |
| | | | H04L 65/4084 |
| | | | 709/219 |
| 2016/0164894 A1 | 6/2016 | Zeitlin et al. | |
| 2016/0380960 A1 | 12/2016 | Pandrangi et al. | |
| 2017/0116279 A1* | 4/2017 | Behnen | G06F 16/284 |
| 2018/0262529 A1* | 9/2018 | Allen | H04L 63/061 |

\* cited by examiner

ADAPTIVE RESPONSE GENERATION ON AN ENDPOINT

CROSS-REFERENCE TO RELATED APPLICATIONS

This application is a continuation of U.S. patent application Ser. No. 15/079,298, filed on Mar. 24, 2016 (pending). The aforementioned application is incorporated herein by reference in its entirety.

BACKGROUND

In the modern era information is one, if not the most, valuable resources of an organization. Protecting the organizational information has become a major concern for the organizations which invest extremely high resources to make sure their information remains secure, unexposed to security threats and inaccessible to unauthorized users.

As the security threats become more and more sophisticated and harder to identify, track and/or prevent, multiple methodologies were developed for protecting the organizational information resources from either internal and/or external security threats and/or breaches.

As most organizations employ a networked environment, the external threats which may originate from outside the organization over one or more networks present a major information security risk. The networked environment may connect the organization internal infrastructure which comprises endpoints and servers as well as networks connecting to the outer world, for example the internet and/or other organizational interconnections. The internal threats may also present major concerns for security threats and/or breaches which may originate from within the organization itself.

In a majority of attacks on the organization's information resources, either internal or external, an attacker may compromise an endpoint in the organizational network. The attacked endpoint may then become the foothold of the attacker in the organizational network, allowing the attacker to advance through the organization network for a plurality of possibly malicious actions, for example, reconnaissance, lateral movement inside the network and/or further activity against selected information resources within the network.

SUMMARY

According to some embodiments of the present invention, there is provided an endpoint configured for adaptively generating responses to data queries, comprising a program store for storing a code and one or more hardware processors of an endpoint coupled to the program store for executing the code. The code comprising:

Code instructions for detecting a data query from a requester with respect to one or more of a plurality of information resources of the endpoint.

Code instructions for adaptively generating a response to the data query. The adaptively generated response comprises data indicative of at least one fictive information resource which is of a similar type as the at least one information resource. The response is adaptively generated according to an analysis of data extracted from one or more of the data query, one or more of the information resources, previous interaction of the requester with the endpoint and/or one or more identified information resource operations at the endpoint which precede the detection of the data query.

Code instructions for providing the adaptively generated response to the requester.

The endpoint is a member selected from a group consisting of: a physical device and/or a virtual device. The virtual device is executed on one or more physical devices.

The requester may be a user, a process, a machine and/or an automated tool.

The one or more information resource may be local information resources which are locally available at the endpoint and/or network information resources which are accessible and/or available from the endpoint over one or more networks through one or more network interfaces of the endpoint.

The code further comprising code instructions for invoking one or more responsive operations based on the analysis of the extracted data. The one or more responsive operations are implemented to mitigate an activity associated with the requester at the endpoint.

The one or more responsive operations include controlling the activity of the requester, disrupting the activity of the requester, monitoring the activity of the requester and/or issuing a warning message indicating of the activity of the requester.

The data query includes an information request regarding existence of the one or more information resources and/or availability of the one or more information resources.

The data query includes an access request to access the one or more information resources.

The data query includes an operation request to the one or more information resources.

Optionally, the adaptively generated response comprises data indicative of one or more emulated operations of the one or more fictive information resources.

Optionally, the code comprises code instructions for intercepting an actual response provided by one or more of the information resources in response to the data query and replacing the actual response with the adaptively generated response.

Optionally, the code comprises code instructions for interactively responding to the requester by adaptively generating one or more additional adaptively generated responses to one or more additional data queries issued by the requester.

Optionally, the code comprises code instructions for identifying an activity pattern of the requester by analyzing the data query and/or one or more of the additional data query issued by the requester.

Optionally, the code comprises code instructions for analyzing the activity pattern of the requester, classifying the activity pattern according to the analysis and generating, based on the classifying, an assessment of whether the activity pattern is indicative of a potential malicious activity.

Optionally, the code comprises code instructions for applying a learning process on the activity pattern to improve future adaptive generation of one or more future adaptively generated responses to one or more future data queries.

Optionally, the code comprises code instructions for directing one or more network accesses indicated by the data query to a designated entity which is in communication with the endpoint over one or more networks.

According to some embodiments of the present invention, there is provided a computer implemented method of adaptively generating responses on an endpoint, comprising using one or more hardware processors at an endpoint for executing a code for:

Detecting a data query from a requester with respect to one or more of a plurality of information resources of the endpoint.

Adaptively generating a response to the data query. The adaptively generated response comprises data indicative of one or more fictive information resource which are of a similar type as the at least one information resource. The response is adaptively generated according to an analysis of data extracted from one or more of, the data query, one or more of the information resource, previous interaction of the requester with the endpoint and/or one or more identified information resource operations at the endpoint which precede the detection of the data query.

Providing the adaptively generated response to the requester.

According to some embodiments of the present invention, there is provided a computer program product for adaptively generating responses on an endpoint, comprising a non-transitory computer readable storage medium and:

First program instructions to detect a data query from a requester with respect to one or more of a plurality of information resources of the endpoint.

Second program instructions to adaptively generate a response to the data query. The adaptively generated response comprises data indicative of one or more fictive information resources which are of a similar type as the one or more information resources. The response is adaptively generated according to an analysis of data extracted from one or more of, the data query, one or more of the information resource, previous interaction of the requester with the endpoint and one or more identified information resource operations at the endpoint which precede the detection of the data query.

Third program instructions to provide the adaptively generated response to the requester.

The first, second and third program instructions are executed by one or more processors of the endpoint from the non-transitory computer readable storage medium.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
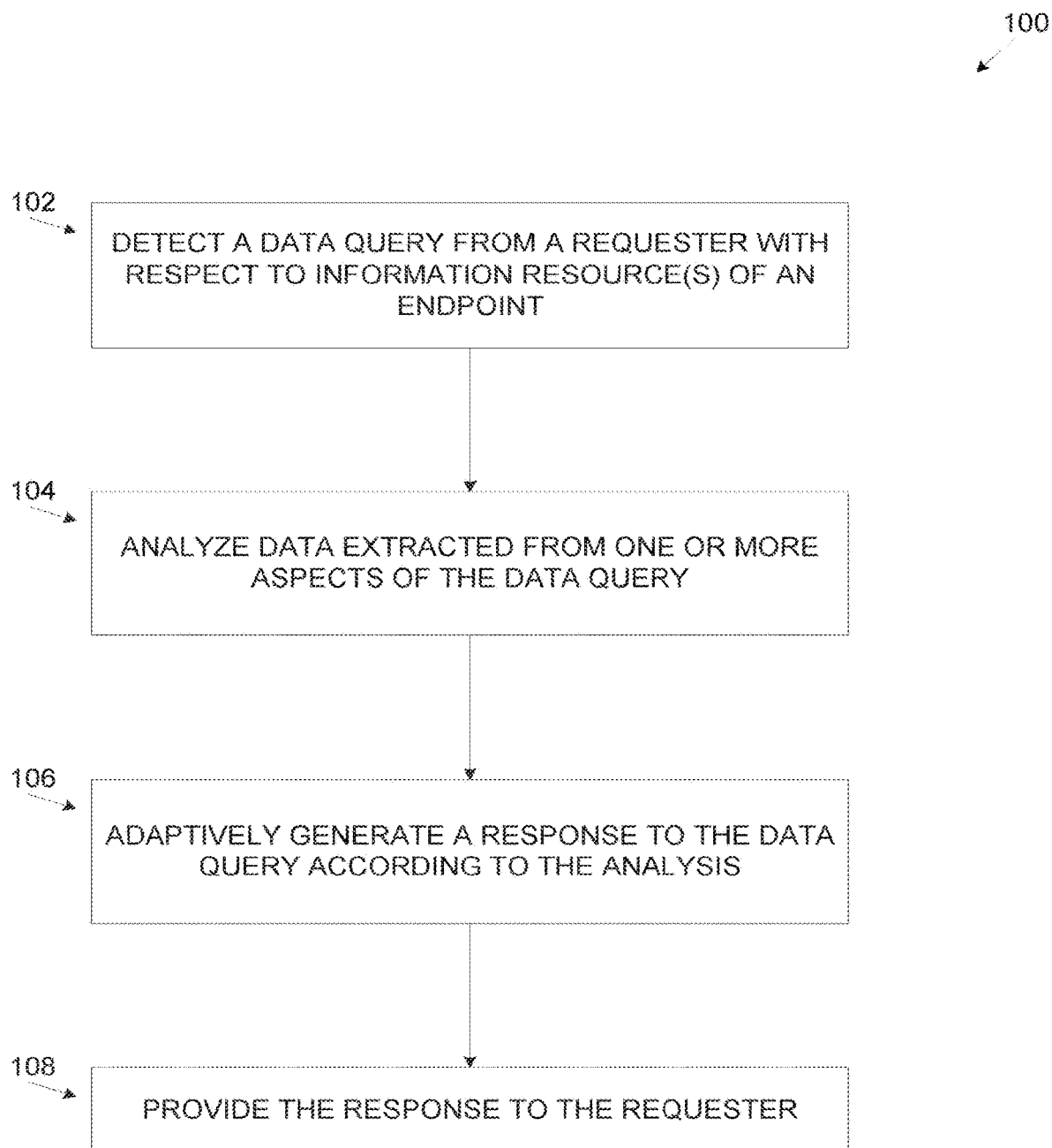
FIG. 1 is a flowchart of an exemplary process for adaptively generating, on an endpoint, responses to data queries, according to some embodiments of the present invention.

The present invention, in some embodiments thereof, relates to adaptively generating on an endpoint responses to data queries, and, more specifically, but not exclusively, to adaptively generating on an endpoint responses to data queries with respect to information resources, where the response comprises data indicative of fictive information resources.

According to some embodiments of the present invention, there are provided devices, methods, systems and computer program products for adaptively generating, on an endpoint, fictive responses to data queries from requester(s) with respect to information resource(s) of the endpoint. The information resources may be local information resources and/or networked information resources available via network(s) to which the endpoint is connected. The adaptively generated response(s) include data indicative of fictive resource(s) of the same type as the information resource(s) referred to in the data query. The adaptively generated response(s) allow detecting and/or deceiving potential unauthorized requesters and/or preventing unauthorized accesses to information resource(s) by leading potential unauthorized requester(s) through one or more logical traps. Furthermore, by leading the requester through the logical traps, false positive detection and/or classification of legitimate users as potential unauthorized requesters may be reduced.

Before further describing the present invention some terms used hereinafter are presented, defines and/or explained.

The term an endpoint may refer to any type of a network communicating device such as a processing node and/or a network node connected and communicating over network(s), for example, a local area network (LAN), a wide area network (WAN), a personal area network (PAN), a metropolitan area network (MAN) and/or the internet. The endpoint device may refer to one or more physical devices, for example, a workstation, a server, a processing node, a cluster of processing nodes, a storage server, a desktop computer, a laptop computer, a smartphone, a tablet, a modem, a hub, a bridge, a switch, a data terminal equipment (DTE) such as a digital telephone handset, a router, a printer and/or any device having a processing node and connected to the network(s). The endpoint may refer to dedicated hardware components such as the physical device(s) as well as to one or more virtual devices, for example, software components, processes and/or services which may provide an abstracted and platform-dependent and/or independent program execution environment. The virtual device(s) may imitate operation of the dedicated hardware components, operate in a physical system environment and/or operate in a virtualized system environment. The virtual devices may include, for example, virtual machines (VMs) which have no direct and/or have a partial correspondence to the one or more hardware components. The virtual devices may further include system VMs (full virtualization VM) which provide a complete or partial system platform supporting execution of an operating system (OS), process VMs, application VMs and/or other virtualized implementations. The endpoint may further include service accounts and other types of services, processes, programs and/or applications which are executed in the physical system environment and/or in the virtualized system environment.

The term information resource may refer to information resources of the endpoint. The information resource(s) may relate to local-side resource(s) at the endpoint itself. The information resource(s) may further relate to network resource(s) which may be available and/or accessible from the endpoint over the network(s) to which the endpoint is connected. The information resources may include one or more physical elements, for example, a memory resident element, a storage element, a printer, a camera, an attachable device and/or a network mapped resource. The information resources may further include user accounts, device accounts, local groups, network groups, local sessions, network sessions, local services, network services and the likes. The information resources may be process-oriented, object-oriented, file system oriented and/or involve other functions embedded in other hardware/software elements to perform one or more services and/or operations. The information resources may be memory resident running, executing and/or embedded programs and/or applications and/or the information resources may be hard-coded on one or more non-volatile memory units of the endpoint, for example, a hard drive, a Flash array and the likes. The information resource(s) may include one or more virtual and/or non-virtual components that are set and/or configured to reside, operate, and/or execute locally on the endpoint and/or on one or more network nodes and/or network entities which are accessible from the endpoint over the network(s). The information resources may include data, metadata and/or other information residing in and/or associated with any of the underlying information system(s) elements and/or services. The information resource(s) may also include cloud information resource(s), for example, storage services and/or social services which are accessible over the internet using information resource(s), for example, credentials obtained from the endpoint information resource(s) (local and/or networked information resources).

The term data query may refer to, for example, access requests to access the information resource(s), operations to the information resource(s), for example, information resource(s) retrieval/manipulation and/or requests for mapping data relating to the information resource(s), for example, existence information and/or availability information.

The term requester may refer to one or more entities initiating the data query(s), for example, a user, a computerized machine, a process and/or an automated tool, for example, an agent, an application, a utility, a memory resident software module, a service, a session and the likes. The requester may be a local requester operating on the endpoint itself and/or the requester may be a remote requester communicating with the endpoint via a communication interface over the network(s) to which the endpoint is connected, for example, an organizational network, an inter-organizational network and/or the internet. The local requester may be a user using a user interface, for example, a keyboard, a mouse, a display and the likes. The local requester may also be a user and/or an automated tool connecting to the endpoint though one or more of the endpoint's local interfaces, for example, a card reader interface, a universal serial bus (USB) interface, a serial port and/or a Bluetooth interface.

The term fictive information resource may refer to one or more fictive information resources which are typically of the same type as the information resource(s) indicated by the data query. The indication to the information resource(s) in the data query may include, for example, an access to the information resource(s), a request to the information resource(s), a specified information resource(s), a correspondence to the information resource(s) and/or a reference to the information resource(s). For example, a format of a file, a listing of a directory, a structure of a database, a map of network hosts, an operation of a network node and the likes. The fictive information resource may also employ a similar input and/or output data format as the information resource(s) indicated by the data query. The fictive information resource may further relate to operations performed by the information resource(s) requested by the data query, for example, communication, data manipulation and the likes. The fictive information resource(s) may be indicated by the response data such that a false representation of the requested information resources is presented to the requester(s).

Adaptively generating the response(s) starts with detecting the data query(s) initiated by the requester at the endpoint by monitoring the activity at the endpoint and/or on the network(s) connected to the endpoint. Monitoring the activity may be done by analyzing for example, command(s), operation(s), action(s), service(s), system call(s), function(s) and the likes which take place at the endpoint. The data query(s) is analyzed and the response(s) to the data query(s) is adaptively generated in runtime to include data indicative of one or more fictive information resources of a type similar to the type of the requested information resource(s). The response(s) may be generated based on one or more aspects of the data query, for example, a type of the data query(s) itself, a type of the requested information resource(s), a previous interaction of the requester with the endpoint and/or identified one or more operations related to the information resource(s) at the endpoint. The response data may also include data indicative of one or more of the information resources of the endpoint, whether actual or fictive resources of the endpoint. The response is thus dynamically adapted to fit the specific activity of the requester at the endpoint while taking into consideration the system activity on the endpoint and/or system activity on the network(s) connected to the endpoint.

In an exemplary use case scenario, the adaptively generated response(s) may be implemented to influence a scope of information associated with the information resources(s) being made available to the requester at the endpoint. By influencing the scope of information generally refers herein to apply to and/or allow for mitigating or containing the requester's activity (current and/or future-intended activity) at the endpoint, deceiving the requester at the endpoint, manipulating the requester with the scope of information and information resources made available at the endpoint, disrupting the activity of the requester, delaying and/or demolishing the requester's activity, neutralizing the requester's activity, among other actions and sub-effects and derivatives thereof. The adaptively generated response(s) may further affect one or more additional data queries and/or operations of the requester. The adaptively generated response(s) is then provided to the requester.

The data query(s) detection, analysis and/or response generation may be done by a non-transient software module, for example, an agent, an application, a utility, a driver, a process, a service and the likes which are executed at the endpoint.

Detecting the data query(s) and generating the adaptive responses may be done transparently to activity on the endpoint itself and/or to network activity on the connected network(s) such as to not to interfere with legitimate activity of the endpoint local system and/or networked system.

Optionally, one or more (real) responses from one or more of the information resources requested by the data query(s) are intercepted and used to adaptively generate the response(s) containing data which may be indicative of fictive information resource(s) of the same type as the requested information resource(s).

Optionally, an activity pattern of the requester is identified and/or classified by analyzing one or more of the data queries issued by the requester. The activity pattern may be used for more efficiently generating the adaptive response(s). The activity pattern may further be used to identify one or more intentions of the requester with respect to the information resource(s). The activity pattern may also be used for assessing and/or determining if the activity of the requester is indicative of potentially malicious activity at the endpoint. One or more activity patterns may also be created for one or more legitimate users typically using the endpoint. Optionally, one or more responsive operations, such as in the form of control actions and/or warning messages, may be taken based on the classified activity pattern. Some non-limiting examples include disrupting the activity of the requester(s) and/or issuing a warning message indicating of potentially malicious activity and/or a possible security threat. The activity pattern(s) may be further used to better distinguish between the legitimate user(s) and potentially malicious requester(s) and/or to avoid false positive classification of the legitimate requester(s) as the potentially malicious requester(s), and so on.

Optionally, the response(s) data aims to contain within the endpoint one or more network accesses made by the data query to one or more of the networked information resources. This means that the network accesses are not actually transmitted over the network but are rather directed back to the endpoint itself. This may assist in creating a fictive networked environment which is contained within the endpoint.

Optionally, the response(s) data aims to direct to a designated network entity one or more network accesses made by the data query to one or more of the networked information resources. This means that the network accesses are directed to the designated entity rather than to actual information resource(s).

Optionally, a learning module is applied to identify the activity pattern of one or more requesters to improve the classification process of the activity pattern of one or more future requesters. The improved classification may allow improving the identification of the intention(s) of the requester, to avoid the false positive detection and/or to enhance the adaptively generated responses. Moreover, the activity pattern may be forwarded to one or more central entities, for example, a network node residing on the organization network, a network node residing on the internet and/or a cloud service. The central entity may collect the activity pattern(s) from a plurality of endpoints to create a central learning service. The central learning service may be used by the endpoints to improve the adaptively generated responses to achieve one or more objectives, for example, detect an unauthorized access, prevent an unauthorized access, contain an unauthorized access and/or stall a potential unauthorized requester.

As opposed to currently existing solutions for identifying and/or preventing unauthorized accesses to the information resource(s), and in particular organizational information resource(s) mostly by monitoring the organizational networks' activity, the approach presented herein is applied to each of the endpoints residing on the network(s). Since the data queries for accessing the organizational information resource(s) may originate from one or more of the endpoints residing on the organization network(s) it is desirable to contain the request locally at the endpoint and avoid accesses to the organization network(s). The unauthorized accesses which may indicate of a possible threat and/or a malicious attack on the organizational information resources. Containing these unauthorized accesses at the attacked endpoint early in the attack lifecycle may prevent progression of the attack into sensitive information resources of the organization. In addition, the contained unauthorized accesses may allow preventing intentionally and/or accidentally executed harmful commands from affecting and/or damaging the organizational information resources. It may be significantly easier to monitor the activity of the requester at the endpoint compared to monitoring anomalies on the organization network(s) which may encompass huge network traffic. Moreover, by monitoring the local activity at the endpoint for detecting the data query(s) and responding to them locally, the local information resource(s) of each endpoint may be easier protected against the unauthorized accesses. Furthermore, by executing the local non-transient software module at the endpoint the need for additional network entities which monitor the network activity may be avoided thus reducing costs and/or system complexity.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a flowchart of an exemplary process for adaptively generating, on an endpoint, responses to data queries, according to some embodiments of the present invention.

Figure 2:
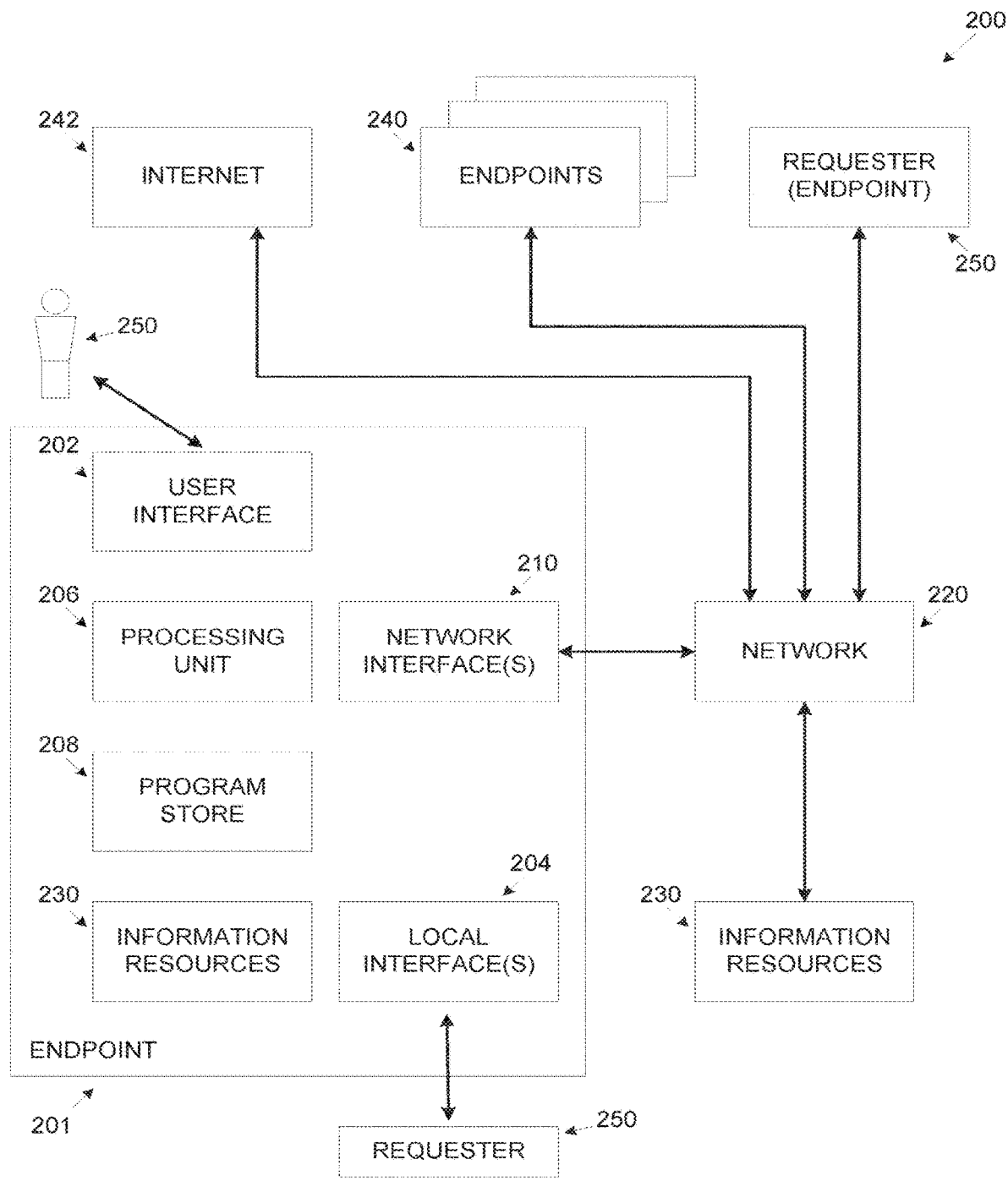
FIG. 2 is a schematic illustration of an exemplary system for adaptively generating, on an endpoint, responses to data queries, according to some embodiments of the present invention.

Reference is also made to FIG. 2 which is a schematic illustration of an exemplary system for adaptively generating, on an endpoint, responses to data queries, according to some embodiments of the present invention. A system 200 includes an endpoint 201 which comprises a user interface 202 for interacting with one or more users, a local interface 204, a processing unit 206, a program store 208 for storing code and a network interface 210 for communicating with, for example, one or more other endpoints 240 and/or the internet 242 over one or more networks 220. The endpoints 240 may reside on one or more networks 220, for example, an organization network, an inter-organization network which connects two or more organizations and/or two or more sites of one or more organizations and/or the internet 242. The network(s) 220 may include one or more networks, for example, a LAN, a WAN, a cellular network and the likes. The processing unit 206 may include one or more processors (homogenous or heterogeneous), which may be arranged for parallel processing, as clusters and/or as one or more multi core processing units. The program store 208 may include one or more non-transitory non-volatile memory devices, for example, a hard drive, a Flash array and the likes.

One or more information resources 230 are available and/or accessible through the endpoint 201. Again, the information resources 230 may be local-side information resources on the endpoint 201 and/or networked information resources available and/or accessible from the endpoint 201 over the network(s) 220. The networked information resources 230 may include, for example, information resources 230 residing on the organization network, on the inter-organization network and/or in the internet 242, for example, a cloud service, a software as a service (SaaS), an infrastructure as a service (IaaS), a platform as a service (PaaS), a desktop as a service (DaaS), a managed software as a service (MSaaS) and the likes.

The endpoint 201 is capable of receiving one or more data queries from one or more requesters 250 to one or more information resources 230 of the endpoint 201.

In some embodiments of the present invention the requester(s) 250 may be a local requester connecting directly to the endpoint 201. The local requester 250 may be a user using the user interface 202, for example, a keyboard, a mouse, a display, a touchscreen and the likes for interacting with the endpoint 201 through, for example, a graphic user interface (GUI) provided by an operating system (OS). The local requester 250 may also be a process and/or an automated tool, for example, an agent, an application, a utility, a memory resident software module, a service, a session and the likes which are executed on the endpoint 201. The local requester 250 may further access the endpoint 201 through one or more if the local interfaces 204, for example, a card reader interface, a USB interface, a serial port and/or a Bluetooth interface. The local requester 250 may use, for example, one or more services of the OS executed on the endpoint 201 to gain access to the information resources. For example, an automated tool residing on a memory card may infiltrate the endpoint 201 through the card reader interface to load into the OS environment of the endpoint 201 to issue one or more data queries. In another example, the local requester 250 may use one or more user terminals, for example, a Smartphone and/or a tablet to connect to the Bluetooth communication service of the OS of the endpoint 201 to gain access to the OS environment.

In some embodiments of the present invention the requester(s) 250 is a remote requester using one or more endpoints 240 which communicate with the endpoint 201 over the network 220 through the network interface 210, for example, from the organization network, the inter-organization network and/or the internet 164. The remote requester 250 may use one or more network communication protocols, for example, internet protocol (IP), transmission control protocol (TCP), file transfer protocol (FTP) and the likes for gaining accesses into the endpoint 201. The remote requester 250 may be a user using a user interface such as the user interface 202 of one or more of the remote endpoint 240 for accessing the endpoint 201. The remote requester 250 may also be a process and/or an automated tool, for example, an agent, an application, a utility, a memory resident software module, a service, a session and the likes which are executed on the remote endpoint(s) 240 and communicate with the endpoint 201 over the network 220. For example, the remote requester 250 may be an automated tool executed on one of the remote endpoints 240 and communicate with the endpoint 201 over the network 220. The remote requester 250 may use one or more network services of the OS of the endpoint 201, for example, TCP and/or TCP/IP to gain access to the OS environment of the endpoint 201.

A process 100 for adaptively generating responses to data queries may be implemented by the processing unit 206 of the endpoint 201 executing code stored in the program store 208. The process 100 may operate in conjunction with one or more software elements, for example, services, utilities and/or processes of the OS of the endpoint 201 and/or hardware elements of the endpoint 201, for example, the network interface 210, the user interface 202, the local interface 204, a storage device and the likes.

The process 100 may be utilized by one or more non-transient software modules, for example, an agent, an application, a utility, a driver, a process, a service and the likes which are executed at the endpoint 201. The software modules of the process 100 may be adapted to attach to one or more other software modules and/or hardware components of the endpoint 201 in order for monitoring activity on the endpoint 201 and/or for providing adaptively generated responses to the requester 250. For example, the software module(s) implementing the process 100 may attach and/or be integrated with one or more software modules of the OS operating on the endpoint 201 in a kernel space and/or a user space, for example, kernel space modules(s), user space modules(s), device driver(s), library(s), stack(s), dedicated software module(s) and the likes.

For example, the software module(s) implementing the process 100 may be deployed on the network driver of the OS of the endpoint 201 to monitor incoming and/or outgoing network communication traffic in order to detect one or more data queries from the requester 250.

In another example, the software module(s) implementing the process 100 may attach to a USB driver of the OS of the endpoint 201 to monitor USB transaction from a USB attachable device connected to the endpoint 201 through the local interface 204 in order to detect data queries from the requester 250. Similarly, the software module(s) implementing the process 100 may be deployed on the network driver of the OS of the endpoint 201 to allow injection of data in the adaptively generated response and provide it to the requester 250 in the same format as an actual (real) response is provided.

The software module(s) implementing the process 100 may operate transparently to normal activity at the endpoint 201, either local activity at the endpoint 201 and/or network activity over the network(s) 220. By transparent operating the process 100 may avoid requesting, requiring and/or prompting any special operation from legitimate (normal) activity at the endpoint 201 local system and/or from the networked system. The transparent operation may further avoid the interaction with the requester 250 from interfering with legitimate activity at the endpoint local system and/or with any of the ongoing networked activities occurring in the networked system environment.

As shown at 102, the process 100 starts with detecting a data query issued by a requester such as the requester 250 to one or more information resources such as the information resources 230. The data query may originate from the requester 250 through the user interface 202 and/or the local interface(s) 204 of the endpoint 201 and/or from the remote requesters 250 over the network 220. The data query may include, for example, an access request and/or an operation request to one or more of the information resources 230. The operation request may include for example, contents retrieval, content manipulation, content deletion and the likes. The data query may be directed at the local information resources 230 and/or fictive information resource of the same type as the information resources 230 indicated by the data query. The data query may also be an access request and/or a communication request to the networked information resources 230 residing on the network(s) 220 and/or to fictive network information resource of the same type as the network information resources 230 indicated by the data query. The data query may further be an operation relating to the information resource(s) 230, for example, a communication session and/or a data manipulation operation.

Detection of the data query may be done by attaching to one or more of the hardware and/or software modules of the endpoint 201 as described hereinabove in order to monitor and/or analyze, for example, command(s), operation(s), action(s), service(s), system call(s), function call(s), application programming interface (API) call(s) and the likes which may be initiated by the data query.

As shown at 104, one or more aspects of the data query are analyzed to identify a context of the data query, for example, the type of the data query, i.e. a nature, a purpose and/or a goal of the data query. The data extracted from the data query may also be analyzed with respect to the type of the information resource(s) 230 indicated by the data query, for example, a file system element, network mapping information, a sensitive database and/or a sensitive data file (for example, credit card numbers, social security numbers, passwords, credentials and the likes) destination of the information resource(s) 230 and the likes. Other aspects of the data query may include the context of the data query with respect to one or more previous data queries during previous interaction of the requester 250 with the endpoint 201. One or more operations which take place prior and/or during the detection of the data query may also be analyzed in order to provide additional context to the data query, for example, network activity on the network 220. Moreover, to further classify the requester 250, the activity of the requester 250 may be analyzed, for example, used services, used process(es), used operation(s), used function(s), packet structure, used communication protocol(s), used communication channel(s), used port(s), communication time, a broadcast size, a type of communication and the likes. One or more characteristics of the requester 250 may also be analyzed, for example, a user level of the requester 250 (for example, sensitive/regular user and the likes), a user type of the requester 250 (for example, finance, information technology (IT), customer care and the likes).

As shown at 106, a response to the data query is adaptively generated in runtime based on the analysis of the data query. The adaptively generated response includes data which is indicative of one or more fictive information resources which may be of a type similar to the type of the information resources 230 indicated by the detected data query, for example, an FTP server, a storage server, a credentials database and the likes. The response data may also include data indicative of one or more operations of the information resources 230, whether actual or fictive information resources of the endpoint 201. The response data may include, for example, fictive mapping information of the actual and/or fictive information resource(s), generated fictive resource(s), fictive content and/or metadata of the actual and/or fictive information resource(s) and/or emulation of one or more operations of the actual and/or fictive information resource(s). The response's data may further include fictive system information of the local system of the endpoint 201 and/or of a networked system to which the endpoint 201 is connected over the networks(s) 220.

The response is adaptively generated according to the analysis of the aspect(s) of the data query such as the type of the data query, the type of the indicated information resource(s) 230, the previous data query(s), activity of the requester 250 and/or one or more operations which occur prior and/or at the time of the data query detection where the operation(s) may indicate activity on the endpoint 201 and/or system/network activity on the network(s) 220. The response may be dynamically adapted in real time to fit the specific activity of the requester 250 at the endpoint 201 in order to create a non-trivial interaction with the requester 250 thus deceiving the requester 250 and presenting non-reliable information resources(s) 230.

Another example for adaptively generating the response according to the type of the data query and/or the type of the information resource 230 indicated by the data query may relate to enumeration of content of a directory of a file system of the endpoint 201 with fictive information. The data query from the requester 250 may comprise a command: dir c:\finance\ directed at locating and/or accessing files containing, for example, credit card numbers. The data query may be detected continuously monitoring sensitive storage locations such as the c:\finanace directory. The requester 250 may be assumed to be a potential unauthorized requester who is not typically using the endpoint 201 because the command dir c:\finance\ may indicate the requester 250 is not familiar with the content of the directory c:\finanace. The adaptively generated response may include fictive directory contents, for example, fictive file names which do not point to actual real files and/or false contents, for example, false credit card numbers. The data provided to the requester 250 may lead requester 250 to stop attempting to retrieve additional information as the requester 250 may believe he has already received what he was looking for.

Following is another example for adaptively generating the response according to the type of the data query and/or the type of the information resource 230 indicated by the data query. The requester 250 issues a data query for accessing one or more of the networked information resource 230. The detected data query comprises a user group membership command such as, for example, net user <usernane>/DOMAIN. The data query command may be detected by using a network driver of an OS executed on the endpoint 201 to analyze outgoing communication. The adaptively generated response provided to the requester 250 may contain data comprising false information, for example, fictive user list and data. The response may be provided to the requester 250 using the same format as used for outputting results of the command net user <username>/DOMAIN.

Following is an example for adaptively generating the response according to the activity of the requester 250 and the type of the information resource(s) 230 indicated by the data query may. A data query from the requester 250 is detected for extracting one or more credentials from a memory array of the endpoint 201 using one or more commands, for example, mimikatz.exe selkurlsa::logonpasswords. The detection may be done by analyzing a token of each process created to initiate the command. The response may be adaptively generated to include data indicative of fictive credentials. The response may be provided to the requester 250 using the same format as used for outputting the results of the command mimnikatz.exe sekurlsa:: logonpasswords.

Following is another example for adaptively generating the response based on the network activity on the network(s) 220. The requester 250 initiates a data query to access a certain server which accepts sockets to a given port, for example, 1433. Based on the detected network activity, the response generation module 122 assumes the accessed server is hosting a database, for example, a Microsoft structured query language (MSSQL) database which is a typical information resource such as the information resource 230. In response to a data query of the requester 250 to access the database response generation module 122 generates a response which includes data indicative of a fictive database.

An example for adaptively generating the response based on previous data queries may be a request to setup a session with one of the endpoints 240. In response to a detected net view data query, the adaptively generated response may include data which maps fictive information resource(s), for example, domain names and/or endpoints such as the endpoints 240 within the network segment indicated by the data query. After providing the response to the requester 250 a following ping data query from the requester 250 is detected to a certain IP address of a fictive endpoint such as the endpoint 240 where the requester 250 used the fictive IP address provided in the response. The adaptively generated response to the ping data query may include data which emulates a response from the fictive endpoint indicated by the data query. A connection request data query may be detected from the requester 250, for example, a request for remote desktop protocol (RDP) connection to the certain IP address of the fictive endpoint. The adaptively generated response may include data which is indicative of an RDP connection to a fictive information resource of the fictive endpoint of the same type as the information resource 230 indicated by the data query.

Optionally, the response generation module 122 adaptively generates one or more response(s) to the requester 250 to emulate a fictive networked system to the requester 250.

An example for emulating the fictive networked system may be emulating a file transfer protocol (FTP) server and/or an FTP session which is actually a fictive FTP session handled at the endpoint 201. Another example, may be presenting a plurality of fictive IP addresses, fictive services, and/or fictive information resources which emulate the information resources 230.

Optionally, an actual (real) response from one or more information resources 230 indicated by the data query is intercepted and the response is adaptively generated based on the intercepted actual response.

An exemplary process for adaptively generating responses to data queries by intercepting responses and emulating a fictive networked system may be intercepting network packets received from an endpoint 240 residing, for example, on the network 220, analyzing the packet(s)' data and adaptively generate the response to include fictive information which emulates the network transactions and is interpreted as legitimate transactions thus not raising any suspicion by the requester 250. The analysis of the data query may involve identifying one or more addresses, for example, the IP address and/or a media access control (MAC) address of the originating endpoint 240 and/or the destination endpoint 240. An exemplary data query includes a network packet(s) originating from the requester 250 at an endpoint 240 having an IP address and port number of 10.10.10.1:4567 (IP:port) and destined for an endpoint 240 having an IP address and port number of 10.10.10.2:8080 (IP:port). The network packets may be detected by monitoring the network activity, for example, by attaching to the endpoint 201 OS network driver and/or the network stack. Following the detection, the response may be adaptively generated to emulate a response(s) from the destination endpoint 240 at 10.10.10.2:8080 to the requester 250 at the originating endpoint 240 at 10.10.10.1:4567. The response data may be injected into the OS network driver and/or the network stack, for example, over the net.exe process of the OS and/or be integrated in the net.exe process such that the response(s) are interpreted by the requester 250 as legitimate response(s) from the destination network node. The detection of the data query network packet(s) and adaptively generating response packet(s) may be repeated for each additional data query from the requester 250 to emulate an entire fictive session between the requester 250 and the destination endpoint 240. The fictive session may include, for example, the requester 250 issuing a data query in comprising a command net user/DOMAIN someUsername for reconnaissance purposes, i.e. gather information about a certain user (someUsername) in the domain. At detection of the command, the response may be adaptively generated. The response which emulate the response(s) from the destination endpoint 240 10.10.10.2:8080 may be adaptively generated, for example:

Add permissions to the queried user (someUsernamne) to make it look more appealing to the requester 250 in order to lure the requester 250 to further pursue the queried user.

Revoke permissions from the queried user (someUsername) to lead the requester 250 away from the queried user in order to protect sensitive accounts from either the potential unauthorized requester and/or from non-privileged legitimate user(s).

Optionally, the adaptively generated response includes data to contain within the endpoint 201 network access(s) made by the data query to the networked information resource(s) 230. This may be done, for example, by mapping a fictive host IP address to the network loopback port of endpoint 201, for example, using the IP address 127.0.0.1. By mapping the network information resources 230 to the endpoint 201, the network access(s) of the data query is not actually transmitted over the network through the network interface module 210 but is rather directed back to the endpoint 201. This may assist in emulating a fictive networked environment visible to the requester 250 which is contained within the endpoint 201. The activity of the requester 250 is thus contained and/or restricted to the endpoint 201, reducing the risk and/or threat level for the networked system.

Following is an example for containing the data query within the endpoint 250. The requester 250 may attempt accessing a remote sharing information resource 230. The data query may comprise an access request to an FTP server, for example, using the command ftp <server_ip>. The data query may be detected by using the network driver of the OS of the endpoint 201 to identify an attempt to open an outgoing connection on the endpoint 201. The software module(s) implementing the process 100 may deploy a local driver on the network driver of the OS of the endpoint 201 which redirects (loops back) network accesses back into the endpoint 201, for example by mapping a fictive FTP server having the IP <server_ip> to port 127.0.0.1. Further data queries to the FTP server at <server_ip> will be therefore routed to the endpoint 201 which may respond with adaptively generated responses emulating the FTP server. The FTP session established with the requester 250 may include one or more fictive transactions, i.e. responses, which are adaptively generated to include, for example, a fictive IP address, fictive FTP server responses, fictive traffic information, fictive information resources names in case the requester 250 attempts to access the information resources(s) on the FTP server, file content manipulation and the likes.

As shown at 108, the adaptively generated response is provided to the requester 250. The adaptively generated response may be provided using one or more of the software and/or hardware elements of the endpoint 201. The adaptively generated response may influence a scope of information associated with or relating to the information resources(s) 130 which is made available to the requester 250. The software module(s) implementing process 100 may attach and/or be deployed on, the example software modules of the OS executing on the endpoint 201 in the kernel space and/or the user space. The response may be provided in a format that complies with a format of the requested information resource 230. For example, in case a text file is requested such as for example, a hosts internet address (IP) list file, the fictive information in the response is formatted in the same format as a respective IP list file but contains false information, for example, one or more fictive hosts.

As another example, the data of the adaptively generated response may be concatenated at the end of an output of one or more real commands issued by the requester 250, for example, a network view command, a domain view command, a user listing command, an account information command, a Windows management instrument (WMI) command, a common internet file system (CIFS) message and the likes.

Optionally, one or more responsive operations are taken based on the analysis of the data query. Such operations may be applied, or implemented with respect to current and or intended activity of the requester to control, limit, disrupt, restrict, contain, block, prevent, monitor, report, delay, demolish, neutralize the activity of the requester, and/or merely to log the activity of the requester 250 at the endpoint 201, among other non-limiting examples thereof such as, in case the requester 250 is suspected to be an unauthorized requester. The responsive operation(s) are taken to mitigate the activity associated with the requester 250 which is suspected as the unauthorized requester. The activity of the requester 250 may further be reported and/or logged at the endpoint 201 and/or at one or more remote endpoints 240 to which the endpoint 201 may report of the activity of the requester 250. The responsive operation(s) may be taken locally by one or more software modules, for example, a process, a utility, an application, a service, a thread and the likes which are invoked on the endpoint 201 itself following detection of the potentially malicious, or unauthorized actions of the requester 250. Alternatively and/or additionally, the endpoint 201 may communicate with one or more of the endpoints 240 to report the detection of the activity of the requester 250, such as in the case the detected activity is indicative of potentially malicious activity at the endpoint 201. The responsive operation(s) may then be taken by invoking or prompting operation of one or more local-side resources at the endpoint 201, for example, a process, a utility, an application, a service, a thread and the likes, to perform the required operation.

The responsive operation(s) may be taken in case of suspected data queries, such as in case of data queries indicative of potentially malicious activity. Some non-limiting use case scenarios may include data queries comprising commands which are typically used by system administrators (for example, network probing commands and the likes), an access(s) request to sensitive file system locations which contain sensitive, or proprietary data items and the likes. A responsive operation taken, for example, by disrupting the requester 250 may eventually lead the requester 250 to stop further trials to access the information resources 230 through the endpoint 201.

Optionally, the responsive operation may be taken, that is carried out, by issuing a triggering or a warning message at the endpoint 201. In such case, for example, a warning message issued at the endpoint 201 may be indicative of potentially malicious activity of requester 250, and/or indicative of potentially unauthorized requester 250 or possibly security threat. The warning message may be performed by a local side resource at the endpoint 201, and/or optionally transmitted to one or more of the security entities of the endpoints 240 which may be responsible for handling security breaches and inform authorized personnel of the security threats.

In some embodiments of the present invention, one or more additional data queries are detected and the process 200 starts over from step 202.

Figure 3:
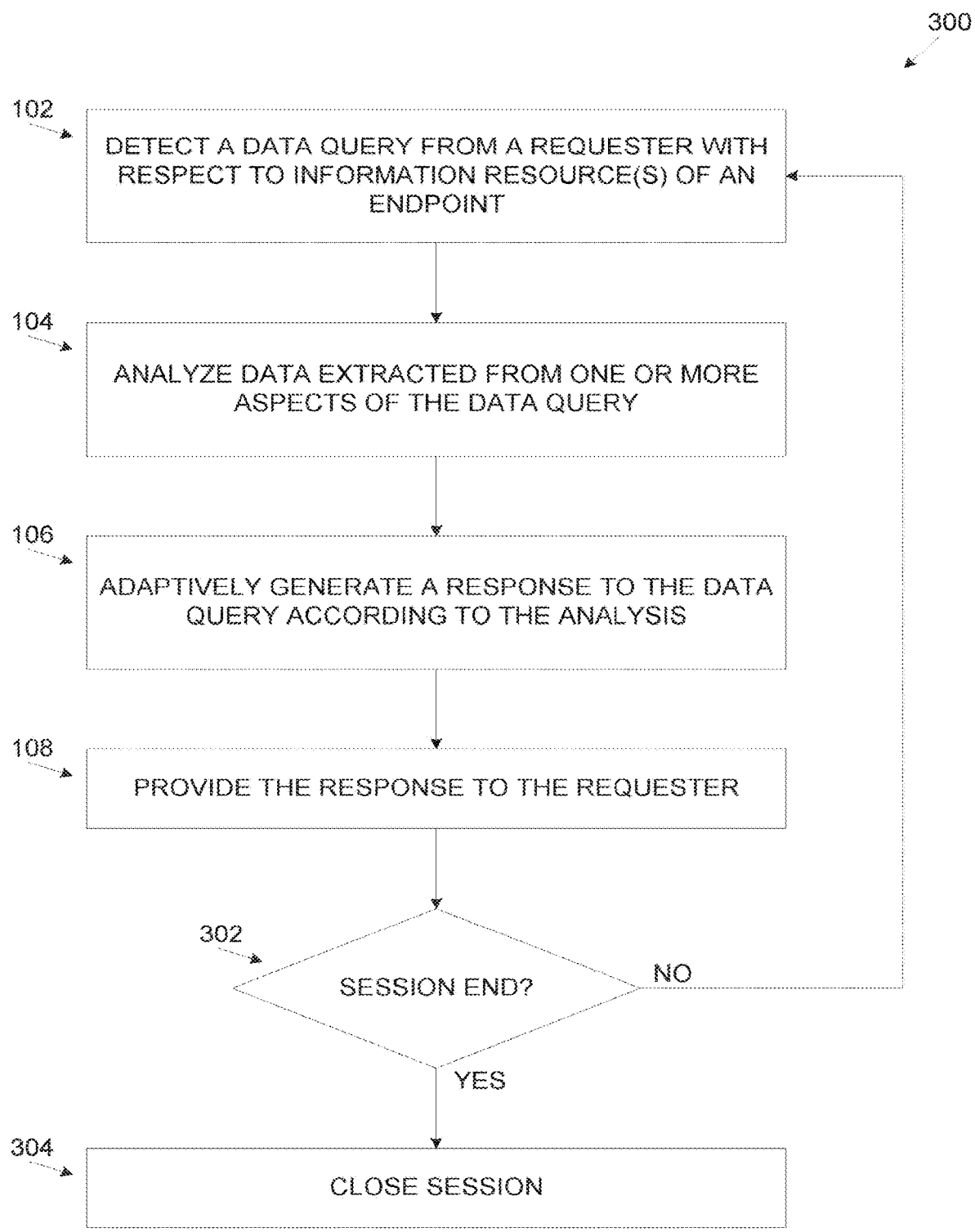
FIG. 3 is a flowchart of an exemplary process for interacting, on an endpoint, with a requester by adaptively generating responses to a plurality of data queries, according to some embodiments of the present invention.

Reference is now made to FIG. 3 which is a flowchart of an exemplary process for interacting, on an endpoint, with a requester by adaptively generating responses to a plurality of data queries, according to some embodiments of the present invention. A process 300 for adaptively generating a plurality of responses to data queries may be implemented by a processing unit such as the processing unit 206 of an endpoint such as the endpoint 201 executing code stored in a program store 4 such as the program store 208. The process 300 may be utilized by one or more non-transient software modules, for example, an agent, an application, a utility, a driver, a process, a service and the likes which are executed at the endpoint 201. The process 300 is an extension to the process 100 and simply repeats the steps of the process 100 in case additional one or more data queries from a requester such as the requester 250 are detected.

The process 100 is followed as described hereinabove and as shown at 302 which is a decision point, after the adaptively generated response is provided to the requester 250, the session with the requester 250 is determined as completed or on-going. In case an additional data query is detected the process 300 branches to step 302 for repeating the process 100 as described herein above. In case no additional data queries are detected the process branches to 304 and the session with the requester 250 is ended and/or closed. An example may be an FTP session initiated by the requester 250 during which a plurality of transactions, i.e. data queries followed by adaptively generated responses, take place. At some point the requester 250 may end the FTP session by issuing a data query which comprises, for example, the FTP session end command bye and/or the FTP connection termination command close. At the detection of such a data query, the process 300 may branch to 304.

By responding to one or more additional data queries an interaction is established between he endpoint 201 and the requester 250. The interaction may be used to lead the requester 250 through a multi-step path in order to better classify the requester 250 as a potential unauthorized requester, identify a lateral movement of the requester 250 through the endpoint 201 and/or through the network(s) 220, detect one or more intentions of the requester 250 and/or reduce and possibly avoid false-positive classification of legitimate requester(s) 250 as the potential unauthorized requester(s). Adapting the response(s) to affect the additional data query(s) may be done by analyzing, for example, the type of the data query, the type of the requested information resources 230 and/or one or more previous responses and adaptively generating the response to fit the detected activity of the requester 250.

Following is an example for an interaction between the requester 250 and the endpoint 201, some of which may represent a detected activity of the requester. During a lateral movement of the requester 250, the requester 250 may issue an access data query to access through the endpoint 201 a specific server located on the network 220. The access request may be detected by analyzing the network communication data by for example, attaching to the network device driver and/or network stack of the OS executing on the endpoint 201. Upon detection of the connection request, the network driver may be re-configured to reroute the data request access request back into the endpoint 201, for example, using port 127.0.0.1 in order, for example, to set a trap for the requester 250. The adaptively generated response may include data indicative of, for example, a fictive server file-system contents (the server file system is considered an information resource such as the information resource 230). The requester 250 may browse through the contents of the fictive server file system while the fictive server file system is continuously updated according to the browsing pattern of the requester 250. Furthermore, appealing file names may be injected in the responses' data such that the requester 250 is lured into the trap in order to provide a definite classification of the requester 250 as the unauthorized requester.

Optionally, an activity pattern from one or more detected activity of the requester 250 is identified for the requester 250 by analyzing one or more of the data queries issued by the requester 250. One or more activity patterns may also be created for respective one or more legitimate requesters 250 typically using the endpoint 201. The activity pattern(s) may be used for more efficiently generating the adaptive response(s) in response to the detected activity of the requester 250. The activity pattern(s) may be further used to better distinguish between the legitimate requester(s) 250 and a potential unauthorized requester 250 and/or to avoid false positive classification of the legitimate requester 250 as a potential unauthorized requester. Moreover, the activity pattern may be used for classifying the requester 250 and/or for assessing and/or determining if the activity of the requester 250 may potentially be malicious activity.

Optionally, one or more intentions of the requester 250 are identified with respect to the information resource(s) 230 based on the type of the data query(s) initiated by the requester 250 and/or based on the activity pattern created for the requester 250. The identified intention(s) of the requester 250 may include, for example, infiltration in which the requester 250 gains hold of the endpoint 201, reconnaissance in which the requester 250 searches for information resources 230 of the endpoint 201 (local and/or networked information resources 230) and/or lateral movement. Identifying the intention(s) of the requester 250 may assist in classifying the requester 250 as a potential unauthorized requester and/or estimate a potential threat level to the information resource(s) 230. Identifying the intentions of the requester 250 may further allow setting one or more traps along the path of the requester 250 since the end goal and/or intermediate goals of the requester 250 are now known. For example, assuming the data query from the requester 250 comprises the command: dir c:\finance\ directed at locating and/or accessing files containing, for example, credit card numbers. The requester 250 may be classified as a potential unauthorized requester trying to retrieve sensitive financial records at the endpoint 201. As another example, in case the data query from the requester 250 is directed at loading a software module such as, for example, a utility, an application, a process, a driver and the likes, the requester 250 may be classified as a potential unauthorized requester trying to deploy a reconnaissance and/or a malicious agent at the endpoint 201 and/or at one or more other endpoints 240 accessible from the endpoint 201 over the network 220.

Optionally, one or more responsive operations are taken based on the classified activity pattern, for example, disrupting, blocking and/or preventing the activity of the requester 250. The responsive operations may further be monitored and/or logged at the endpoint 201 and/or at one or more remote endpoints 240. The responsive operation(s) may be taken by one or more local-side resources at the endpoints, for example, a process, a utility, an application, a thread and the likes.

Alternatively and/or additionally, the responsive operation may be taken by communicating with one or more of the endpoints 240 and reporting the activity of the requester. For example, by issuing a warning message or indication indicating of potentially malicious activity of requester 250 and/or to indicate of a possible security threat. The warning indication may be issued to one or more entities on one or more security entities of the endpoints 240.

In another example, the responsive operation may involve disrupting activity associated with the requester 250. Such may eventually lead the requester 250 to stop further trials to access the information resources 230.

In some embodiments of the present invention, a learning model is created to learn the activity pattern of one or more requesters such as the requesters 250 to improve the classification process of the activity pattern and/or intentions of one or more future requesters 250.

Figure 4:
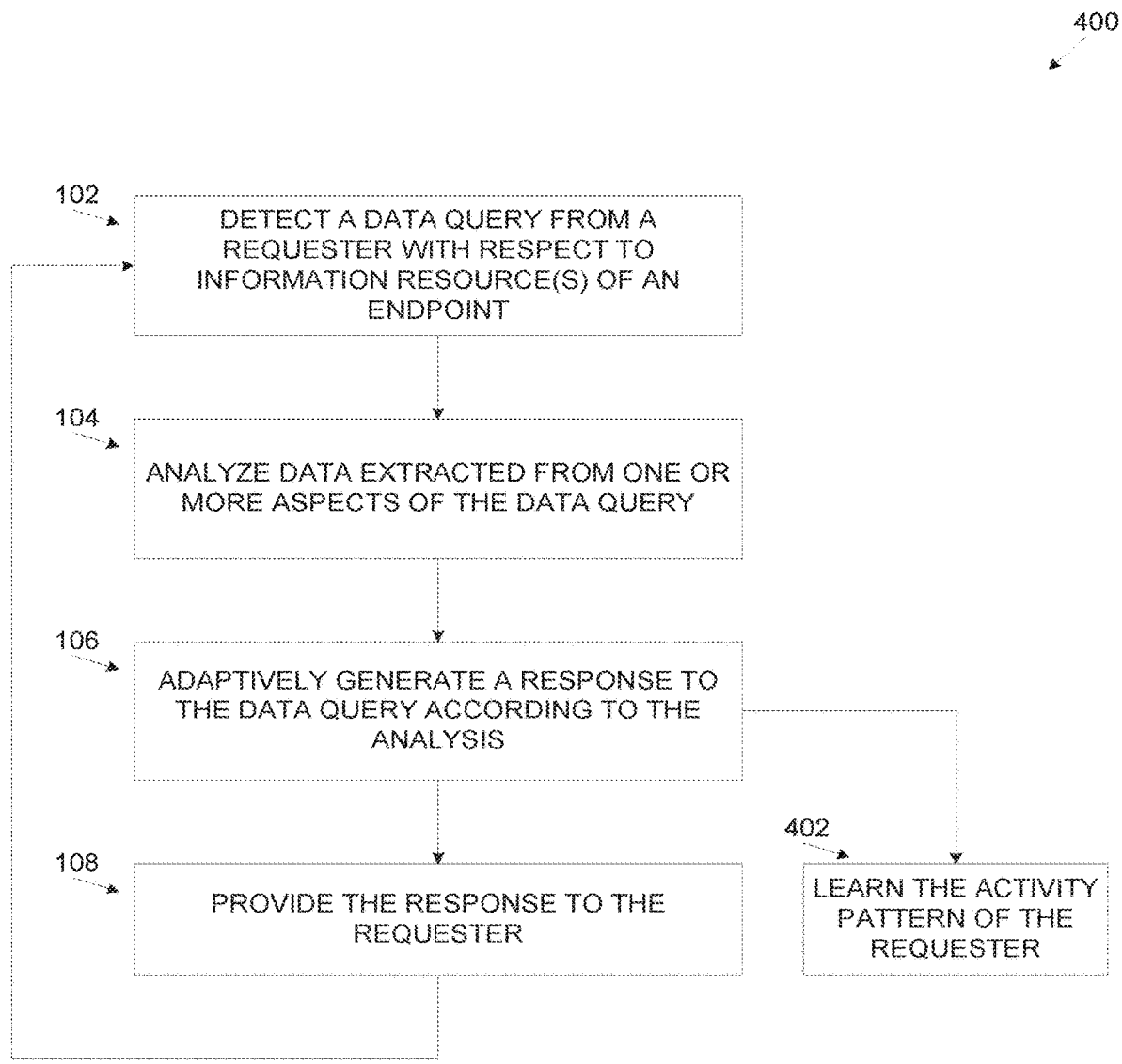
FIG. 4 is a flowchart of an exemplary process for learning activity pattern during interaction with a requester on an endpoint, according to some embodiments of the present invention.

Reference is now made to FIG. 4 which is a flowchart of an exemplary process for learning activity pattern during interaction with a requester on an endpoint, according to some embodiments of the present invention. A process 400 for learning activity patterns of a plurality of requesters such as the requester 250 may be implemented by a processing unit such as the processing unit 206 of an endpoint such as the endpoint 201 executing code stored in a program store such as the program store 208. The process 400 may be utilized by one or more non-transient software modules, for example, an agent, an application, a utility, a driver, a process, a service and the likes which are executed at the endpoint 201. The process 400 is an extension to the processes 100 and 300. Information on the data queries and the adaptively generated responses is collected and/or analyzed in order to create a learning model.

The process 300 is followed as described hereinabove and as shown at 402, following the adaptive response generation step 106 (during each iteration), information relating to the data query as well as the response data is collected and analyzed in order to create a learning model. The learning model may learn, for example, the activity pattern of one or more legitimate users, an activity pattern of one or more past requesters 250, typical operations performed to the information resource(s) 230 and the likes. The learning model may further analyze the impact of provided adaptively generated responses on following data queries. By analyzing the interaction between the requester 250 and the endpoint 201 the learning model may determine, for example, best course of action for various interaction scenarios, optimal trap strategy and the likes. The learning model may also analyze system activity of the endpoint 201 (either local system activity and/or networked system activity) to identify a correlation between the system activity and the data query(s) and hence the adaptively generated response(s). Moreover, the learning model may allow predicting future actions of the requester 250 based on past experience collected and analyzed by the learning model.

The learning model may then be used during the response adaptive generation phase to better adapt the response to the detected data query based on past experience. Using the learning model, the adaptively generated responses may be tailored to accommodate recent and/or previous users operations and/or system operations of the information resources 230. For example, the response may be generated according to previous one or more data queries of the requester 250 and/or of past requesters 250. The learning model may be further used to lead the requester 250 through a specific path based on identified previous activity patterns of the past requester(s) in order to trap the requester 250 and/or to stall the requester 250. The learning model may create the activity patterns based on one or more characteristics of the requester 250, for example, opened information resources, accessed information resources, opened programs and/or applications, working hours and/or a typing speed.

Optionally, the learning model is deployed in one or more network entities such as the endpoints 240. The learning model may collect information from a plurality of endpoints such as the endpoint 201 to increase a learning database and/or use case scenarios. Furthermore, the learning model may be implemented as a cloud service accessible by the endpoint 201 through the network(s) 220.

In some embodiments of the present invention, the data included in the response(s) directs one or more network accesses to information resource(s) such as the information resource(s) 230 to one or more designated network entities which may emulate the information resource(s) 230 and or operation(s) of the information resource(s) 230.

Figure 5:
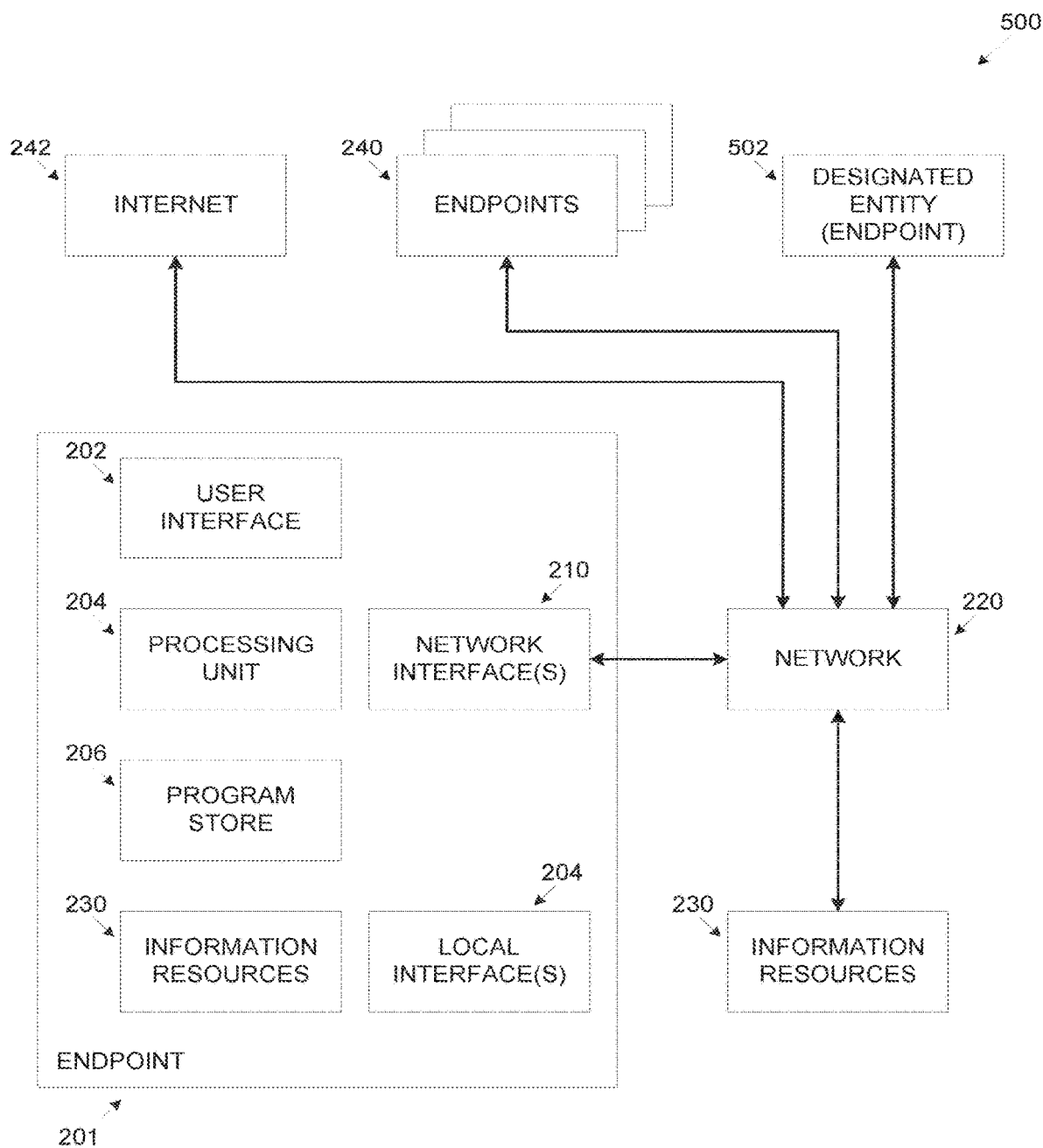
FIG. 5 is a schematic illustration of an exemplary system for directing accesses of data queries (to information resources) to a designated network entity which emulates the information resources, according to some embodiments of the present invention.

Reference is now made to FIG. 5 which is a schematic illustration of an exemplary system for directing accesses of data queries (to information resources) to a designated network entity which emulates the information resources, according to some embodiments of the present invention. A system 500 is similar to the system 200 described hereinabove with the addition of a designated network entity 502. The designated network entity 502 may include one or more endpoints such as the endpoints 240, for example, an endpoint, a server, a network node and/or a network service which reside on the network(s) 220.

The adaptively generated responses may include data which may direct to the designated network entity one or more accesses indicated by the data query to the information resource(s) such that the designated network entity emulates the information resource(s) 230 and/or emulates an operation of the information resource(s) 230. Directing the accesses to the designated network entity 502 may serve, for example, to consolidate emulation of the information resources 230 accessed for multiple endpoints such as the endpoint 201 to a single place.

Furthermore the designated network entity 502 may be implemented with the learning model thus avoiding the need to distribute directions for adaptive response generation to the plurality of endpoints 201.

Following is an example for directing accesses indicated by a data query to the designated network entity 502 which may emulate the information resource(s) 230 indicated by the data query. A requester such as the requester 250 may attempt accessing a remote sharing information resource 230. The data query to the endpoint 201 may comprise an access request to an FTP server hosted by an endpoint 240 having an IP address and port number of 10.10.10.1:20 (IP:port), using for example, the command using the command ftp <10.10.10.1:20>. The data query may be detected at the endpoint 201 and re-directed to the designated network entity 502 having an IP address and port number of 10.10.10.10:20 (IP:port). Further data queries to the FTP server at <10.10.10.1:20> will be therefore routed to the designated network entity 502 at 10.10.10.10:20 which may respond with adaptively generated responses emulating the FTP server. The FTP session established with the requester 250 may include one or more fictive transactions, i.e. responses, which are adaptively generated to include, for example, a fictive IP address, fictive FTP server responses, fictive traffic information, fictive information resources names in case the requester 250 attempts to access the information resources(s) on the FTP server, file content manipulation and the likes.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises". "comprising", "includes". "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for adaptively generating responses on an endpoint, the method comprising:

monitoring an endpoint to detect a data query from a requester to access an endpoint information resource of the endpoint;

adaptively generating a fictive response to the data query, wherein the fictive response comprises emulation data indicative of a fictive information resource configured to emulate the endpoint information resource;

providing the fictive response to the requester;

monitoring a subsequent interaction with the requester in response to the fictive response; and determining, based on an analysis of the subsequent interaction, a classification of whether the requester is a legitimate requester.

2. The computer implemented method of claim 1, wherein the method further comprises applying a control action based on the determination, the control action being associated with at least one of the requester, the data query, the endpoint, or the endpoint information resource.

3. The computer implemented method of claim 1, wherein the fictive response is adaptively generated in runtime by analyzing at least one of:
data extracted from a previous interaction of the requester with the endpoint;
an actual response generated by the endpoint information response; or
activity on at least one of the endpoint or a network associated with the endpoint.

4. The computer implemented method of claim 1, further comprising determining an activity pattern for the requester based on at least one of the data query or the interaction.

5. The computer implemented method of claim 4, wherein determining the classification of whether the requester is a legitimate requester is further based on the activity pattern.

6. The computer implemented method of claim 4, wherein determining the classification of whether the requester is a legitimate requester comprises comparing the activity pattern with a legitimate requester activity pattern.

7. The computer implemented method of claim 1, further comprising:
intercepting an actual response provided by the endpoint information resource in response to the data query; and
replacing the actual response with the adaptively generated fictive response.

8. The computer implemented method of claim 1, wherein monitoring the subsequent interaction with the requester comprises providing a plurality of additional fictive responses and identifying a plurality of additional data queries by the user in response to the plurality of additional fictive responses.

9. The computer implemented method of claim 8, wherein determining the classification of whether the requester is a legitimate requester comprises determining an increased likelihood that the requester is a legitimate requester based on the plurality of additional data queries.

10. A system configured for adaptively generating responses to data queries, the system comprising:
at least one memory device for storing instructions; and
at least one hardware processor coupled to the program store for executing the instructions to perform operations comprising:
monitoring an endpoint to detect a data query from a requester to access an endpoint information resource of the endpoint;
adaptively generating a fictive response to the data query, wherein the fictive response comprises emulation data indicative of a fictive information resource configured to emulate the endpoint information resource;
providing the fictive response to the requester;
monitoring a subsequent interaction with the requester in response to the fictive response; and
determining, based on an analysis of the subsequent interaction, a classification of whether the requester is a legitimate requester.

11. The system of claim 10, wherein the endpoint comprises at least one of a physical device or a virtual device executed on a physical device.

12. The system of claim 10, wherein the at least one endpoint information resource comprises at least one of:
a local information resource locally available at the endpoint, or
a network information resource accessible from the endpoint over a network.

13. The system of claim 10, wherein the data query includes an access request to access the endpoint information resource.

14. The system of claim 10, wherein the data query includes an operation request to the endpoint information resource.

15. The system of claim 10, wherein the adaptively generated fictive response further comprises data indicative of an emulated operation of the fictive information resource.

16. The system of claim 10, wherein the operations further comprise:
identifying an activity pattern of the requester by analyzing the data query and the interaction.

17. The system of claim 16, wherein determining that the requester is a legitimate requester is further based on the activity pattern.

18. The system of claim 16, wherein determining the classification of whether the requester is a legitimate requester comprises comparing the activity pattern with a legitimate requester activity pattern.

19. The system of claim 16, wherein the operations further comprise:
applying a learning process on the activity pattern to improve future adaptive generation of a future adaptively generated fictive response to at least one future data query.

20. A non-transitory computer readable medium including instructions that, when executed by at least one processor, cause the at least one processor to perform operations for adaptively generating responses to data queries, the operations comprising:
monitoring an endpoint to detect a data query from a requester to access an endpoint information resource of the endpoint;
adaptively generating a fictive response to the data query, wherein the fictive response comprises emulation data indicative of a fictive information resource configured to emulate the endpoint information resource;
providing the fictive response to the requester;
monitoring a subsequent interaction with the requester in response to the fictive response; and
determining, based on an analysis of the subsequent interaction, a classification of whether the requester is a legitimate requester.

* * * * *